(12) United States Patent
Xu

(10) Patent No.: US 12,309,701 B2
(45) Date of Patent: May 20, 2025

(54) METHOD AND DEVICE FOR DETERMINING PARAMETER OF POWER SAVING SIGNAL, TERMINAL AND STORAGE MEDIUM

(71) Applicant: GUANGDONG OPPO MOBILE TELECOMMUNICATIONS CORP., LTD., Dongguan (CN)

(72) Inventor: Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 356 days.

(21) Appl. No.: 17/515,342

(22) Filed: Oct. 29, 2021

(65) Prior Publication Data

US 2022/0060990 A1 Feb. 24, 2022

Related U.S. Application Data

(63) Continuation of application No. PCT/CN2019/085240, filed on Apr. 30, 2019.

(51) Int. Cl.
*H04W 52/02* (2009.01)
*H04W 72/044* (2023.01)
*H04W 72/23* (2023.01)

(52) U.S. Cl.
CPC ..... *H04W 52/0235* (2013.01); *H04W 72/044* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2013/0003663 A1 | 1/2013 | Blankenship et al. | |
| 2020/0092813 A1* | 3/2020 | Kim | H04W 52/0274 |
| 2020/0314756 A1* | 10/2020 | Xu | H04L 5/0053 |
| 2021/0243763 A1* | 8/2021 | Zhou | H04L 1/1671 |
| 2022/0022176 A1* | 1/2022 | Chen | H04W 76/28 |
| 2022/0201614 A1* | 6/2022 | Wang | H04W 72/23 |
| 2022/0338119 A1* | 10/2022 | Seo | H04W 72/044 |

FOREIGN PATENT DOCUMENTS

| | | | |
|---|---|---|---|
| CN | 109496446 A | 3/2019 | |
| CN | 109496452 A | 3/2019 | |
| WO | WO-2020038546 A1 * | 2/2020 | ........ H04W 52/0235 |

OTHER PUBLICATIONS

Extended European Search Report issued in corresponding European Application No. 19927019.0, mailed Mar. 24, 2022, 11 pages.
"PDCCH-based power saving signal/channel for UE adaptation", Source: ASUSTeK, 3GPP TSG RAN WG1 #96bis, R1-1904902, Xi'an, China, Apr. 8-12, 2019, 3 pages.

(Continued)

*Primary Examiner* — German Viana Di Prisco
(74) *Attorney, Agent, or Firm* — BAYES PLLC

(57) ABSTRACT

The embodiments of the present disclosure provide a method and a device for determining a parameter of a power saving signal. The method includes determining a second physical downlink control channel (PDCCH) parameter of the power saving signal according to a first PDCCH parameter of a first bandwidth part (BWP) of a terminal.

18 Claims, 7 Drawing Sheets

--- acquiring a parameter of a first PDCCH control resource set of PDCCH search space of a first BWP of a terminal — 601 determining all of parameters of a second PDCCH control resource set of the power saving signal according to the parameter of the first PDCCH control resource set of the PDCCH search space of the first BWP — 602

(56) References Cited

OTHER PUBLICATIONS

3GPP TS 38.213 V15.1.0 (Mar. 2018), Technical Specification Group Radio Access Network; NR; Physical layer procedures for control (Release 15), 77 pages.
"Summary of Offline Discussion on RMSI", Source: CATT, 3GPP TSG RAN WG1 Meeting AH 1801, R1-1800230, Vancouver, Canada, Jan. 22-26, 2018, 49 pages.
"Text proposal for PDCCH structure", Source: OPPO, 3GPP TSG RAN WG1 Meeting AH 1801, R1-1800494, Vancouver, Canada, Jan. 22-26, 2018, 6 pages.
International Search Report issued in corresponding International Application No. PCT/CN2019/085240, mailed Jan. 19, 2020, 37 pages.
PCT Written Opinion of the International Searching Authority issued in corresponding International Application No. PCT/CN2019/085240, mailed Jan. 19, 2020, 7 pages.
"PDCCH-based power saving channel design", Agenda item: 7.2.9.1, Source: Qualcomm Incorporated, 3GPP TSG-RAN WG1 #96bis, R1-1905031, Xi'an, China, Apr. 8-12, 2019, 13 pages.
"Design of PDCCH-based power saving signal/channel", Agenda Item: 7. 2 9 1, Source: Ericsson, 3GPP TSG RAN WG1 Meeting #9 6 bis, Tdoc R1-1905466, Xi'an , China , Apr. 8-Apr. 12, 2019, 4 pages.

\* cited by examiner

METHOD AND DEVICE FOR DETERMINING PARAMETER OF POWER SAVING SIGNAL, TERMINAL AND STORAGE MEDIUM

CROSS-REFERENCE TO RELATED APPLICATION

The present application is a continuation of International Application No. PCT/CN2019/085240 filed on Apr. 30, 2019, the entire contents of which are hereby incorporated by reference.

BACKGROUND

The present disclosure relates to the field of mobile communications, and in particular to a method and device for determining a parameter of a power saving signal, a terminal and a storage medium.

In a 5G New Radio (NR) system and Long-Term Evolution (LTE), an enhanced mechanism for discontinuous reception (DRX) is being discussed. A basic mechanism of DRX is to configure a DRX cycle for a UE in a radio resource control (RRC) connected state, wherein the DRX cycle includes the period of On Duration and the period of Opportunity for DRX.

Since a terminal is only scheduled opportunistically during a periodic period of On Duration, there is PDCCH detection without detecting data scheduling in most periods of On Duration. If the terminal blindly detects a PDCCH when there is no data scheduling, power for detection is wasted. During the discussion process about communication standard, a scheme has been proposed in which if a base station determines that there is a need to schedule the terminal during the period of On Duration, it will send a power saving signal to the terminal. The power saving signal is used for waking up the terminal so that the terminal performs the PDCCH detection during On Duration of DRX.

At present, the Third Generation Partnership Project (3GPP) has decided to adopt a physical downlink control channel (PDCCH) to realize transmission of the power saving signal, but there is no solution about how to configure a reception parameter of the power saving signal.

SUMMARY

According to an aspect of the present disclosure, there is provided a method for determining a parameter of a power saving signal. The method is applied to a terminal, and includes acquiring a first PDCCH parameter of a first bandwidth part (BWP) of the terminal; and determining a second PDCCH parameter of the power saving signal according to the first PDCCH parameter.

According to an aspect of the present disclosure, there is provided a device for determining a parameter of a power saving signal. The device includes a receiving module, configured to acquire a first PDCCH parameter of a first BWP of the terminal; and a processing module, configured to determine a second PDCCH parameter of the power saving signal according to the first PDCCH parameter.

According to another aspect of the present disclosure, there is provided a device, and the device includes a processor; a transceiver, connected to the processor; and a memory, configured to store an executable instruction of the processor, wherein the processor is configured to load and execute the executable instruction to implement the method for determining the parameter of the power saving signal as described above.

According to another aspect of the present disclosure, there is provided a computer readable storage medium. The computer readable storage medium stores at least one instruction, at least one program, a code set, or an instruction set. The at least one instruction, the at least one program, the code set, or the instruction set is loaded and executed by a processor, to implement the method for determining the parameter of the power saving signal as described above.

BRIEF DESCRIPTION OF THE DRAWINGS

In order for clarity in description of technical solutions in embodiments of the present disclosure, the following will give a brief introduction to accompanying drawings used for describing the embodiments. Apparently, the accompanying drawings described below are some embodiments of the present disclosure. Based on these drawings, those of ordinary skill in the art may also obtain other drawings without creative effort.

DETAILED DESCRIPTION

In order to make objectives, technical solutions, and advantages of the present disclosure clearer, implementations of the present disclosure will be further described in detail below in conjunction with the accompanying drawings.

Figure 1:
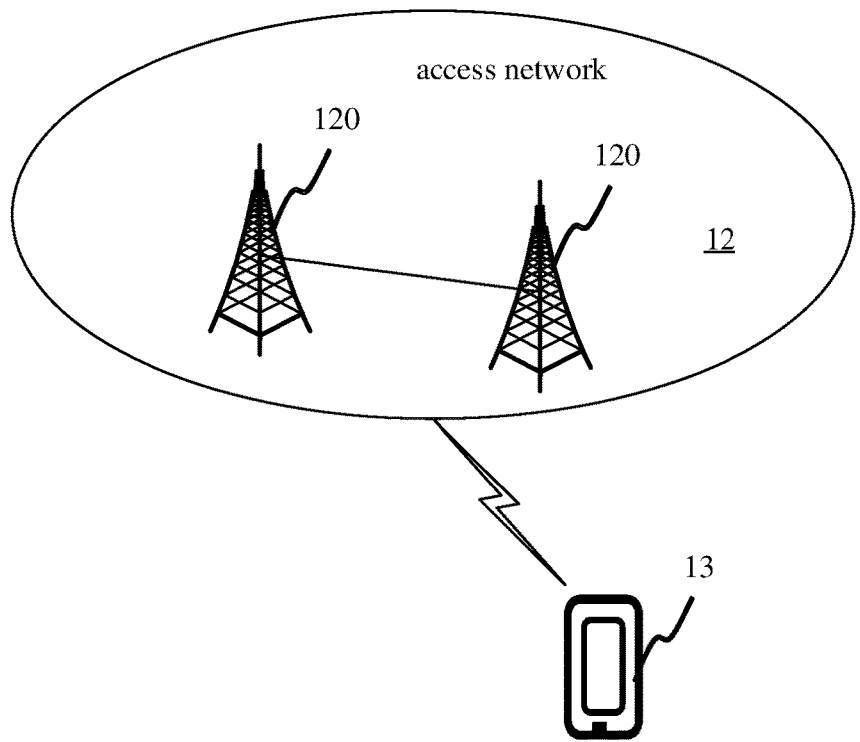
FIG. 1 is a block diagram of a communication system provided by an exemplary embodiment of the present disclosure.

FIG. 1 is a system structure diagram of a communication system shown in an exemplary embodiment of the present disclosure. As shown in FIG. 1, the communication system may include an access network 12 and a terminal 13.

The access network 12 includes several access network devices 120. An access network device 120 and a core network device 110 communicate with each other through a certain interface technology, such as a S1 interface in a LTE system, and a NG interface in a 5G NR system. The access network device 120 may be a base station, which is a device deployed in the access network to provide a wireless communication function for the terminal. The base station may include various forms of macro base stations, micro base stations, relay stations, access points, and so on. In systems using different radio access technologies, names of devices with base station functions may be different. For example, in the LTE system, a device with the base station functions is called eNodeB or eNB; in the 5G NR systems, a device with the base station functions is called gNodeB or gNB. With evolution of communication technologies, the name "base station" may be described and will change. For convenience, in embodiments of the present disclosure, the above-mentioned devices for providing wireless communication functions for the terminal are collectively referred to as the access network device.

The terminal 13 may include various handheld devices, vehicle-mounted devices, wearable devices, computing devices with wireless communication functions, or other processing devices connected to a wireless modem, as well as various forms of user equipment (UE), mobile stations (MS), terminal devices, and so on. For ease of description, the devices mentioned above are collectively referred to as the terminal. The access network device 120 and the terminal 13 communicate with each other through a certain air interface technology, such as a Uu interface.

The following is a brief introduction to several technical terms involved in embodiments of the present disclosure.

Discontinuous Reception (DRX). DRX allows the UE to periodically enter a sleep period at certain times without monitoring PDCCH scheduling information (or a PDCCH sub-frame). When the UE needs to monitor the PDCCH scheduling information, it wakes up from the sleep period. In this way, the UE can achieve a purpose of power saving.

Figure 2:
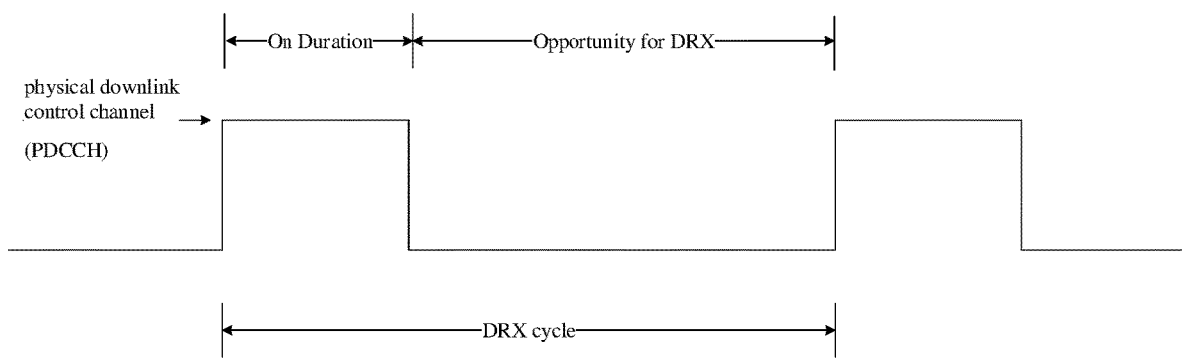
FIG. 2 is a schematic diagram of a DRX mechanism provided by an exemplary embodiment of the present disclosure.

A basic mechanism of DRX is to configure a DRX cycle for the UE in a RRC_CONNECTED state. The DRX cycle is composed of "On Duration" and "Opportunity for DRX". During the period of "On Duration", the UE monitors and receives the PDCCH scheduling information. During the period of "Opportunity for DRX", the UE does not receive data of a downlink channel to save power consumption. As may be seen from FIG. 2, in time domain, time is divided into successive DRX cycles. When the UE receives a scheduling message during the period of "On Duration", the UE will start a DRX-inactivity timer and monitor the PDCCH scheduling information in each sub-frame of this period. While the DRX-inactivity timer is running, even if the originally configured On Duration time has expired, the UE still needs to continue monitoring a downlink PDCCH sub-frame, until the DRX-inactivity timer expires.

One DRX cycle is equal to a sum of wake-up time and sleep time of the UE. The wake-up time is the time duration of On Duration in one cycle, and the sleep time is the time duration of Opportunity for DRX in one cycle.

Power saving signal. In 5G and LTE evolution projects, an enhanced mechanism of DRX is currently being discussed. For example, although the network has configured the DRX mechanism for the terminal, the terminal is only scheduled opportunistically during the periodic period of On Duration. Even when the terminal has a very low service load, the terminal is only scheduled during a few DRX cycles. For the paging message that adopts the DRX mechanism, the terminal has fewer opportunities to receive the paging message. Therefore, after the terminal is configured with the DRX mechanism, there is still PDCCH detection without detecting data scheduling in most periods of On Duration. If the terminal blindly detects the PDCCH when there is no data scheduling, power for detection is wasted. Therefore, there is room for further optimization with respect to the current DRX mechanism.

A current solution is that if the base station determines that there is a need to schedule the terminal in DRX On Duration, it sends the power saving signal to the terminal. The power saving signal is used for waking up the terminal, so that the terminal performs the PDCCH detection during DRX On Duration. Otherwise, if the base station determines that there is no need to schedule the terminal during DRX On Duration, it may instruct the terminal not to perform the PDCCH detection during DRX On Duration.

In addition, it is found in researches that, in addition to the use of waking up the terminal for PDCCH detection, the power saving signal may also be used for indicating information such as a target BWP used by the terminal upon waking up and a configuration of PDCCH search space used by the terminal upon waking up. In embodiments of the present disclosure, functions of the power saving signal may include all or part of the above-mentioned functions, or may include functions not shown in the above-mentioned functions. The present disclosure is not limited in this regard.

Power saving signal based on PDCCH. The power saving signal may be a signal based on a ZC sequence, or a signal based on a PDCCH channel. Using the PDCCH channel for carrying power saving indication information has the following advantages, and accordingly, has received widespread attention: directly multiplexing an existing PDCCH design, including coding, scrambling, resource mapping, search space, CORESET, etc., thereby obtaining a small standardization workload; and good compatibility and multiplexing characteristics with other signal transmission, because an existing system already supports the PDCCH channel, and the PDCCH and other channels such as a PDSCH have good compatibility and multiplexing characteristics.

At present, it has been determined in the 3GPP discussions to adopt the PDCCH channel as the power saving signal.

PDCCH Search Space of NR. PDCCH monitoring of the NR UE is performed in the PDCCH search space. The PDCCH search space is generally notified to the terminal by the network device through a RRC signaling. Configuration information of the search space includes the following information: search ID; controlResourceSetId, used for indicating an ID of a configuration of the control resource set, and configuring a time-frequency resource of the PDCCH search space; a period of a monitored slot and an offset within the period, wherein the period currently supported by NR includes 1, 2, 4, 5, 8, 10, 16, 20, 40, 80, 160, 320, 640, 1280, 2560 slots; Duration, indicating the number of slots continuously monitored in the PDCCH search space period; monitoringSymbolsWithinSlot, indicating on which symbols in the slots monitored by the PDCCH to perform the PDCCH monitoring; PDCCH candidates, indicating configuration information of the PDCCH candidates; and Type of search space, indicating whether the PDCCH search space is a common search space or a UE-specific search space.

CORESET. In the 5G NR system, a concept of CORESET is introduced to define a time-frequency resource set for carrying control information. The UE detects a NR-PDCCH channel in the time-frequency resource set to obtain scheduling information. Configuration information of CORESET mainly includes the following information: a PRB occupied by CORESET; the number of consecutive OFDM symbols occupied by CORESET; an initial value of a PDCCH DMRS scrambling sequence; a pre-coding granularity in frequency domain; a mapping type between a CCE and a REG; quasi co-location information of an antenna port, used for indicating quasi co-location information of a DMRS antenna port used for PDCCH reception, wherein such information helps to select a TCI state from the TCI-States configured by a high level signaling and configure it to the terminal through MAC CE; and an indication about whether a TCI field appears in a DCI format 1_1.

PDCCH configuration information in NR BWP. NR can support a larger working bandwidth. In order to meet different bandwidth requirements of different services of the terminal and realize energy saving of the terminal, NR introduces a concept of BWP. The terminal may be configured with up to four BWPs.

For each BWP of the terminal, the network can configure up to ten PDCCH search spaces, and configure up to three PDCCH CORESETs.

Figure 3:
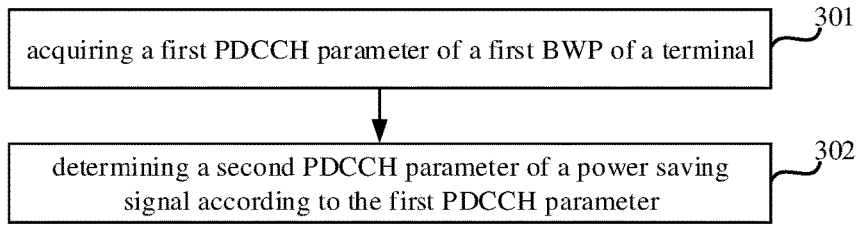
FIG. 3 is a flowchart of a method for determining a parameter of a power saving signal provided by an exemplary embodiment of the present disclosure.

FIG. 3 shows a flowchart of a method for determining a parameter of a power saving signal provided by an exemplary embodiment of the present disclosure. This embodiment is exemplified by executing the method by the terminal or the access network device in FIG. 1. The method includes the following steps.

In step 301, a first PDCCH parameter of a first BWP of the terminal is acquired.

The first BWP is a BWP used by the terminal. The first PDCCH parameter is a PDCCH parameter configured by the access network device to the terminal.

In step 302, a second PDCCH parameter of the power saving signal is determined according to the first PDCCH parameter of the first BWP of the terminal.

The terminal or the access network device determines part or all of the second PDCCH parameters of the power saving signal based on the first PDCCH parameter.

In summary, in the method provided by embodiments of the present disclosure, the configuration of the PDCCH control resource set and/or the PDCCH search space of the power saving signal may partially or completely re-use the configuration of the PDCCH control resource set and/or the PDCCH search space of the BWP. This may not only save signaling overhead between the terminal and a base station, but also ensure transmission performance of the power saving signal based on a mature configuration way in which the PDCCH control resource set and/or the PDCCH search space are configured for the BWP.

In an optional embodiment shown in FIG. 3, the first PDCCH parameter of the first BWP includes a parameter of a first PDCCH control resource set of the first BWP; or a parameter of a first PDCCH search space of the first BWP; or a parameter of the first PDCCH control resource set of the first BWP and a parameter of the first PDCCH search space of the first BWP.

Correspondingly, the second PDCCH parameter of the power saving signal includes a parameter of a second PDCCH control resource set of the power saving signal; or a parameter of a second PDCCH search space of the power saving signal; or a parameter of the second PDCCH control resource set of the power saving signal and a parameter of the second PDCCH search space of the power saving signal.

Figure 4:
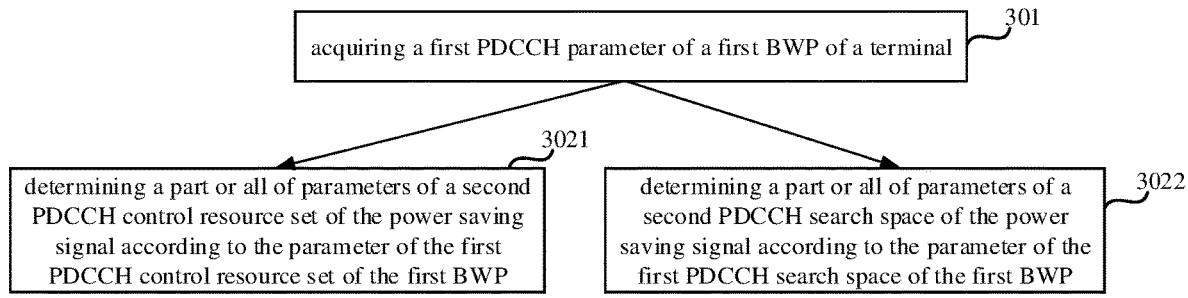
FIG. 4 is a flowchart of a method for determining a parameter of a power saving signal provided by another exemplary embodiment of the present disclosure.

Based on the optional embodiment shown in FIG. 3, the step 302 may include at least one of the following steps 3021 and 3022, as shown in FIG. 4.

In the step 3021, part or all of parameters of the second PDCCH control resource set of the power saving signal is determined according to the parameter of the first PDCCH control resource set of the first BWP.

In the step 3022, part or all of parameters of the second PDCCH search space of the power saving signal is determined according to the parameter of the first PDCCH search space of the first BWP.

Figure 5:
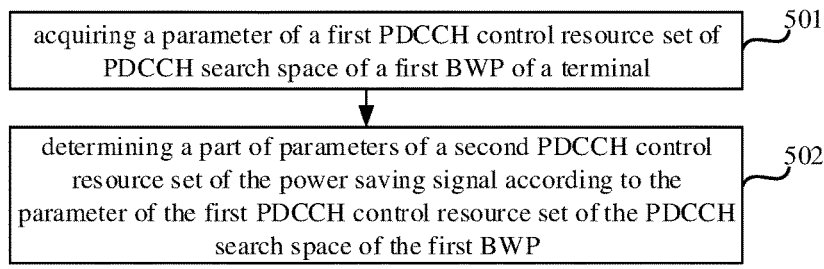
FIG. 5 is a flowchart of a method for determining a parameter of a power saving signal provided by another exemplary embodiment of the present disclosure.

FIG. 5 is a flowchart of a method for determining a parameter of a power saving signal provided by an exemplary embodiment of the present disclosure. This embodiment is exemplified by executing the method by the terminal or the access network device in FIG. 1. The method includes the following steps.

In step 501, a parameter of the first PDCCH control resource set of the PDCCH search space of the first BWP of the terminal is acquired.

When the method is executed by the terminal, the terminal acquires parameters of multiple PDCCH control resource sets of the first BWP configured by the access network device, and determines the parameter of the first PDCCH control resource set configured by the PDCCH search space of the first BWP out from the parameters of the multiple PDCCH control resource sets.

When the method is executed by the access network device, the access network device reads the parameters of the multiple PDCCH control resource sets of the first BWP of the terminal from a memory, and determines the parameter of the first PDCCH control resource set configured by the PDCCH search space of the first BWP out from the parameters of the multiple PDCCH control resource sets.

In an embodiment, the first PDCCH control resource set is a control resource set configured by the access network device for the PDCCH search space of the first BWP of the terminal.

In step 502, a part of parameters of a second PDCCH control resource set of the power saving signal is determined according to the parameter of the first PDCCH control resource set of the PDCCH search space of the first BWP.

Optionally, other remaining parameters may be configured by the access network device to the terminal through a third configuration signaling, which is a radio resource control (RRC) signaling or a media access control (MAC) control element (CE) signaling. For example, in order to save the power consumption of the terminal receiving the power saving signal, the PDCCH control resource set of the power saving signal may be configured to use the number of PRBs with a narrower bandwidth. That is, the access network device sends the third configuration signaling to the terminal, and the third configuration signaling is used for indicating other remaining parameters of the second PDCCH control resource set. Correspondingly, the terminal receives the third configuration signaling sent by the access network device, and determines other remaining parameters of the second PDCCH control resource set according to the third configuration signaling.

As an example of the above embodiment, the terminal or the access network device determines a TCI state used by the control resource set of the power saving signal based on a TCI state of an antenna port of the PDCCH control resource set configured by the first PDCCH search space configured for the BWP.

As another example of the above embodiment, the terminal or the access network device determines a PRB occupied by the second PDCCH control resource set of the power saving signal based on the PRB occupied by the PDCCH control resource set configured by the first PDCCH search space configured for the BWP.

As another example of the above embodiment, the terminal or the access network device determines the number of consecutive OFDM symbols occupied by the second PDCCH control resource set of the power saving signal based on the number of consecutive OFDM symbols occupied by the PDCCH control resource set configured by the first PDCCH search space configured for the BWP.

As another example of the above embodiment, the terminal or the access network device determines the initial value of the PDCCH DMRS scrambling sequence used by the second PDCCH control resource set of the power saving signal based on the initial value of the PDCCH DMRS scrambling sequence used by the PDCCH control resource set configured by the first PDCCH search space configured for the BWP.

It should be noted that the above mentioned part of parameters may be at least one of the following parameters: a PRB occupied by the second PDCCH control resource set; the number of consecutive OFDM symbols occupied by the second PDCCH control resource set; an initial value of a PDCCH DMRS scrambling sequence; a pre-coding granularity in frequency domain; a mapping type between a CCE and a REG; quasi co-location information of an antenna port; and an indication about whether a TCI field appears in a DCI format 1_1.

In the embodiments, the multiplexing configuration way of each parameter will not be repeated one by one, and this is the content that those skilled in the art can easily think of based on the above examples.

In summary, in the method provided by embodiments of the present disclosure, a part of the parameters of the second PDCCH control resource set of the power saving signal are re-using the parameter of the first PDCCH control resource set configured for the first PDCCH search space of the BWP, and other remaining parameters are configured by the RRC signaling or the MAC CE signaling. This may not only save the signaling overhead between the terminal and the access network device as much as possible, but also ensure parameter setting of the second PDCCH control resource set of the power saving signal while retaining a certain personalized configuration.

Figure 6:
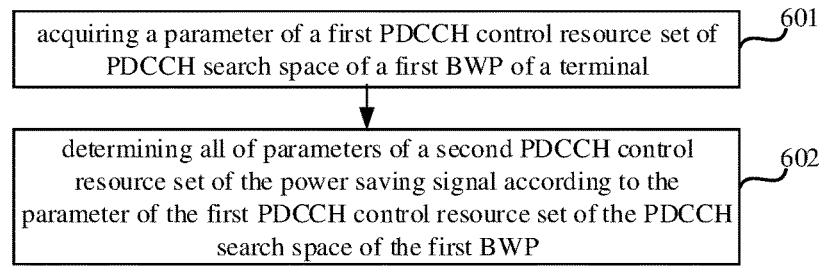
FIG. 6 is a flowchart of a method for determining a parameter of a power saving signal provided by another exemplary embodiment of the present disclosure.

FIG. 6 is a flowchart of a method for determining a parameter of a power saving signal provided by an exemplary embodiment of the present disclosure. This embodiment is exemplified by executing the method by the terminal in FIG. 1. The method includes the following steps.

In step 601, a parameter of the first PDCCH control resource set of the PDCCH search space of the first BWP of the terminal is acquired.

When the method is executed by the terminal, the terminal acquires parameters of multiple PDCCH control resource sets of the first BWP configured by the access network device, and determines the parameter of the first PDCCH control resource set configured by the PDCCH search space of the first BWP out from the parameters of the multiple PDCCH control resource sets.

When the method is executed by the access network device, the access network device reads the parameters of the multiple PDCCH control resource sets of the first BWP of the terminal from a memory, and determines the parameter of the first PDCCH control resource set configured by the PDCCH search space of the first BWP out from the parameters of the multiple PDCCH control resource sets.

In an embodiment, the first PDCCH control resource set is a control resource set configured by the access network device for the PDCCH search space of the first BWP of the terminal.

In step 602, all of parameters of a second PDCCH control resource set of the power saving signal are determined according to the parameter of the first PDCCH control resource set of the PDCCH search space of the first BWP.

As an example of the above embodiment, all parameters of the second PDCCH control resource set include a PRB occupied by the second PDCCH control resource set; the number of consecutive OFDM symbols occupied by the second PDCCH control resource set; an initial value of a PDCCH DMRS scrambling sequence; a pre-coding granularity in frequency domain; a mapping type between a CCE and a REG; quasi co-location information of an antenna port; and an indication about whether a TCI field appears in a DCI format 1_1.

In summary, in the method provided by embodiments of the present disclosure, all of the parameters of the second PDCCH control resource set of the power saving signal are re-using all the parameters of the first PDCCH control resource set configured for the first PDCCH search space of the BWP. This may save the signaling overhead between the terminal and the access network device as much as possible.

The access network device can configure at most ten PDCCH search spaces and at most 3 PDCCH control resource sets for one BWP of the terminal. Therefore, a correspondence between the second PDCCH control resource set of the power saving signal and the first PDCCH control resource set configured by the first PDCCH search space configured by the BWP needs to be clarified. Exemplarily, any of the following ways may be used.

According to the first way, the power saving signal uses only a single second PDCCH control resource set.

When the power saving signal uses only a single second PDCCH control resource set, based on the method shown in FIG. 5 or FIG. 6, the terminal or the access network device needs to determine a certain PDCCH control resource set among the multiple PDCCH control resource sets configured for the BWP as the first PDCCH control resource set used for configuration parameter multiplexing.

In some embodiments, the terminal or the access network device determines a PDCCH control resource set of the first BWP as the first PDCCH control resource set in a pre-determined way, wherein the pre-determined way refers to a way pre-determined by a communication protocol. In other embodiments, the access network device sends a first configuration signaling to the terminal, and the first configuration signaling is used for indicating that a PDCCH control resource set of the first BWP is determined as the parameter of the first PDCCH control resource set. The terminal receives the first configuration signaling sent by the access network device, and determines a PDCCH control resource set of the first BWP as the parameter of the first PDCCH control resource set according to the first configuration signaling. In other embodiments, the terminal or the access network device determines a PDCCH control resource set occupying the narrowest bandwidth among the PDCCH control resource sets of the first BWP as the first PDCCH control resource set. The first configuration signaling may be the RRC signaling or the MAC CE signaling.

In some embodiments, the terminal or the access network device determines a PDCCH control resource set among the PDCCH control resource sets configured for the PDCCH search space of the first BWP in an agreed way as the first PDCCH control resource set. The pre-determined way refers to a way pre-determined by a communication protocol. In other embodiments, the access network device sends the first configuration signaling to the terminal, and the first configuration signaling is used for indicating that a PDCCH control resource set among the PDCCH control resource sets configured for the PDCCH search space of the first BWP is determined as the parameter of the first PDCCH control resource set. The terminal receives the first configuration signaling, and determines a PDCCH control resource set among the PDCCH control resource sets configured for the PDCCH search space of the first BWP as the parameter of the first PDCCH control resource set. In other embodiments, the terminal or the access network device determines a PDCCH control resource set occupying the narrowest bandwidth among the multiple PDCCH control resource sets configured for the PDCCH search space of the first BWP as the first PDCCH control resource set. The first configuration signaling may be the RRC signaling or the MAC CE signaling.

According to the second way, the power saving signal uses a plurality of second PDCCH control resource sets.

When the power saving signal uses only a single second PDCCH control resource set, based on the method shown in FIG. 5 or FIG. 6, the terminal or the access network device needs to determine at least two PDCCH control resource sets among all the PDCCH control resource sets configured for the BWP as the first PDCCH control resource set for configuration parameter multiplexing.

In some embodiments, the number of the second PDCCH control resource sets of the power saving signal is the same as the number of the multiple first PDCCH control resource sets configured by the first BWP. For example, if the access network device configures three first PDCCH control resource sets for the BWP of the terminal, all or part of the parameters of the three second PDCCH control resource sets of the power saving signal re-use the parameters of the three first PDCCH control resource sets, respectively.

In other embodiments, the number of the second PDCCH control resource sets of the power saving signal is the same as the number of the first PDCCH control resource sets of the PDCCH search space of the first BWP. For example, if the access network device configures three first PDCCH control resource sets for the PDCCH search space of the BWP of the terminal, all or part of the parameters of the three second PDCCH control resource sets of the power saving signal re-use the parameters of the three first PDCCH control resource sets, respectively.

In other embodiments, the number of the second PDCCH control resource sets of the power saving signal is the same as the number of the first PDCCH control resource sets with different TCI states of the PDCCH search space of the first BWP. For example, the access network device configures four first PDCCH search spaces for the BWP of the terminal, and there are TCI states of the PDCCH control resource sets of two first PDCCH search spaces (that is, there are three different TCI states). Then, all or part of the parameters of the three second PDCCH control resource sets of the power saving signal re-use the parameters of the first PDCCH control resource sets corresponding to the first PDCCH search spaces of the three different TCI states.

Figure 7:
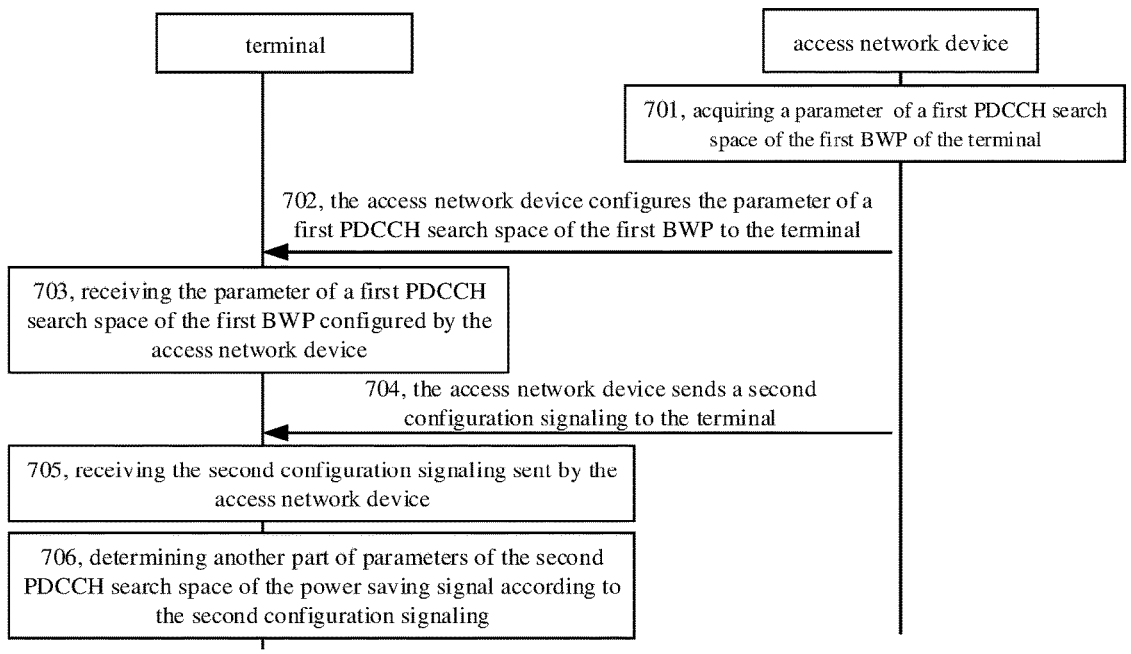
FIG. 7 is a flowchart of a method for determining a parameter of a power saving signal provided by another exemplary embodiment of the present disclosure.

FIG. 7 is a flowchart of a method for determining a parameter of a power saving signal provided by another exemplary embodiment of the present disclosure. This embodiment is exemplified by executing the method by the terminal in FIG. 1. The method includes the following steps.

In step 701, the access network device acquires the parameter of the first PDCCH search space of the first BWP of the terminal; and the access network device reads the parameter of the first PDCCH search space of the first BWP configured for the terminal stored in the memory.

In step 702, the access network device configures the parameter of the first PDCCH search space of the first BWP to the terminal.

In step 703, the terminal receives the parameter of the first PDCCH search space of the first BWP configured by the access network device.

As an example of the above embodiment, the parameter of the first PDCCH search space include at least one of the following parameters: 1. a search space identification or search ID; 2. a control resource set identification or control Resource Set Id, used for indicating an identification of a configuration set by the control resource, and configuring a time-frequency resource of the PDCCH search space; 3. a period of a monitored slot and a first offset within the period, wherein the period currently supported by NR includes 1, 2, 4, 5, 8, 10, 16, 20, 40, 80, 160, 320, 640, 1280, 2560 slots; 4. duration, used for indicating the number of slots continuously monitored in the period of PDCCH search space; 5. monitoring symbols within slot, used for indicating on which symbols in the slots monitored by the PDCCH to perform the PDCCH monitoring; 6. PDCCH candidate information, used for indicating configuration information of the PDCCH candidates; and 7. a type of search space, used for indicating whether the PDCCH search space is a common search space or a UE-specific search space.

In step 702, the access network device or the terminal determines a part of parameters of the second PDCCH search space of the power saving signal according to the parameter of the first PDCCH search space.

As an example of the above embodiment, the terminal or the access network device determines a control resource set identification of the second PDCCH search space according to a control resource set identification in the first PDCCH search space.

As an example of the above embodiment, the terminal or the access network device determines the period of the monitored slot in the second PDCCH search space according to the period of the monitored slot in the first PDCCH search space.

As an example of the above embodiment, the terminal or the access network device determines the time duration of the second PDCCH search space according to the time duration of the first PDCCH search space.

As an example of the above embodiment, the terminal or the access network device determines the monitoring symbol of the second PDCCH search space according to the monitoring symbol in the first PDCCH search space.

As an example of the above embodiment, the terminal or the access network device determines the PDCCH candidate information of the second PDCCH search space according to the PDCCH candidate information in the first PDCCH search space.

As an example of the above embodiment, the terminal or the access network device determines the type of the search space for the second PDCCH search space according to the type of the search space in the first PDCCH search space.

In step 704, the access network device sends a second configuration signaling to the terminal.

In step 705, the terminal receives the second configuration signaling sent by the access network device.

In step 706, the terminal determines another part of the parameters of the second PDCCH search space of the power saving signal according to the second configuration signaling.

As an example of the above embodiment, the second configuration signaling carries a second offset, and the terminal determines an offset of the monitored slot in the second PDCCH search space of the power saving signal according to the first offset and the second offset of the monitored slot in the first PDCCH search space.

Figure 8:
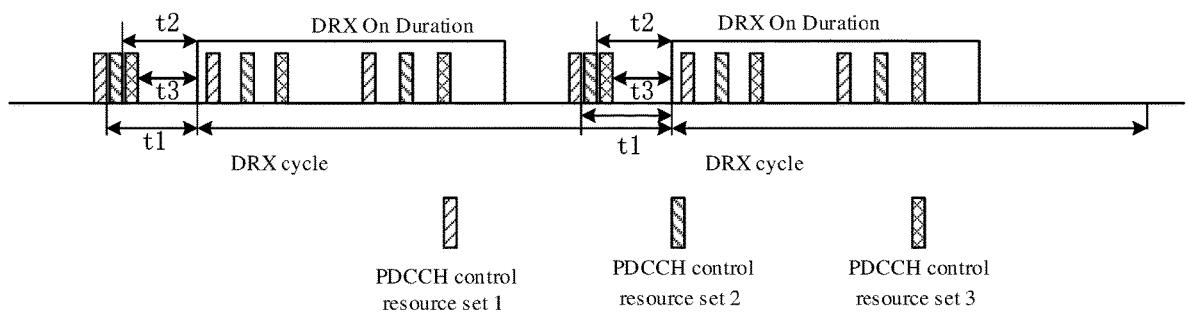
FIG. 8 is a schematic implementation diagram of a method for determining a parameter of a power saving signal provided by another exemplary embodiment of the present disclosure.

With reference to FIG. 8, the terminal determines three second PDCCH control resource sets 1 to 3 of the power saving signal based on the step 701 and the step 702. Besides, the terminal also receives second offsets t1, t2, and t3 configured by the second configuration signaling, and determines the PDCCH search space of the power saving signal 1 according to the second offset t1, determines the PDCCH search space of the power saving signal 2 according to the second offset t2, and determines the PDCCH search space of the power saving signal 3 according to the second offset t3.

In some embodiments, when there are multiple power saving signals in a single DRX cycle, the access network device may also send only one of the power saving signals to wake up the terminal. Illustratively, the access network device only sends the earliest power saving signal 1, without sending the power saving signal 2 and the power saving signal 3.

In summary, in the method provided by embodiments of the present disclosure, a part of the parameters of the second PDCCH search space of the power saving signal are re-using the parameter of the first PDCCH control resource set configured for the first PDCCH search space of the BWP, and other remaining parameters are configured by the RRC signaling or the MAC CE signaling. This may not only save the signaling overhead between the terminal and the access network device as much as possible, but also ensure parameter setting of the second PDCCH control resource set of the power saving signal while retaining a certain personalized configuration.

Figure 9:
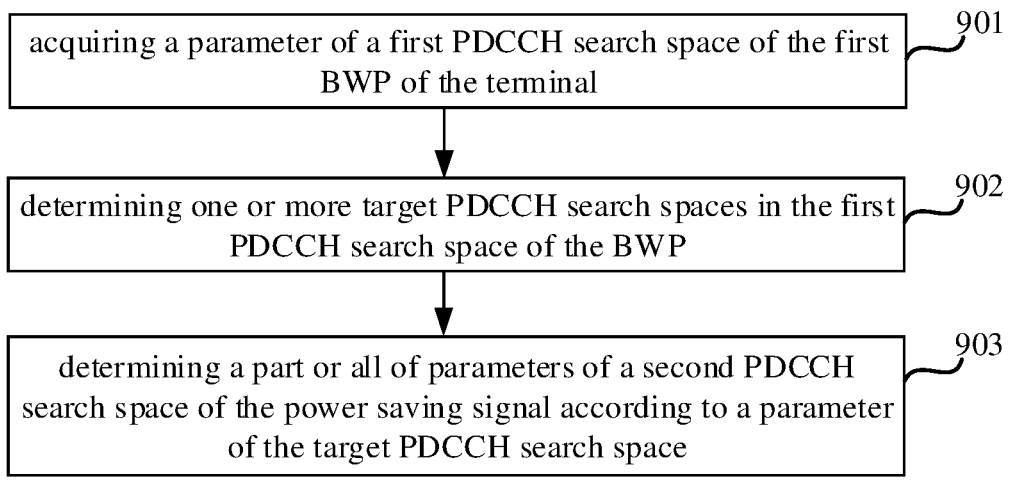
FIG. 9 is a flowchart of a method for determining a parameter of a power saving signal provided by another exemplary embodiment of the present disclosure.

FIG. 9 is a flowchart of a method for determining a parameter of a power saving signal provided by another exemplary embodiment of the present disclosure. This embodiment is exemplified by executing the method by the terminal or the access network device in FIG. 1. The method includes the following steps.

In step 901, a parameter of the first PDCCH search space of the first BWP of the terminal is acquired.

The terminal acquires the parameter of the first PDCCH search space of the first BWP configured by the access network device. There may be multiple first PDCCH search spaces of the first BWP. The access network device reads the parameter of the first PDCCH search spaces of the first BWP configured for the terminal, which are stored in the memory.

As an example of the above embodiment, the first BWP is a downlink BWP currently activated by the terminal.

In step 902, one or more target PDCCH search space is determined in the first PDCCH search space of the BWP.

When there are multiple first PDCCH search spaces of the first BWP, the terminal or the access network device determines one or more target PDCCH search space among the multiple first PDCCH search spaces. The target PDCCH search space is a search space for parameter multiplexing by the power saving signal.

In step 903, a part or all of the parameters of the second PDCCH search space of the power saving signal are determined according to the parameter of the target PDCCH search space.

In summary, in the method provided by embodiments of the present disclosure, a part or all of the parameters of the second PDCCH search space of the power saving signal are re-using the parameter of the target PDCCH search space of the BWP. This may save the signaling overhead between the terminal and the access network device as much as possible.

With respect to the BWP switching scenario, the present disclosure also provides the following embodiments.

Figure 10:
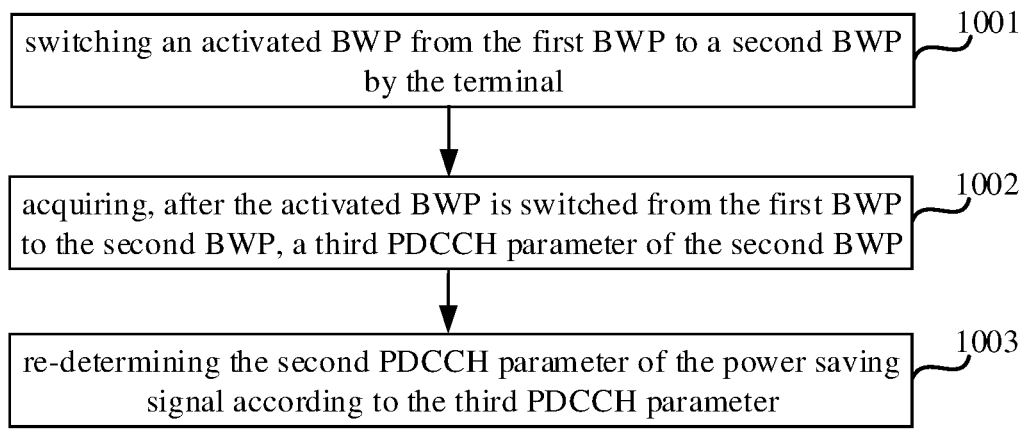
FIG. 10 is a flowchart of a method for determining a parameter of a power saving signal according to another exemplary embodiment of the present disclosure.

FIG. 10 is a flowchart of a method for determining a parameter of a power saving signal provided by another exemplary embodiment of the present disclosure. This embodiment is exemplified by executing the method by the terminal or the access network device in FIG. 1. The method includes the following steps.

In step 1001, the activated BWP is switched from a first BWP to a second BWP.

The terminal switches the currently activated BWP from the first BWP to the second BWP according to its own service requirements or the configuration of the access network device. The present embodiment is not limited with regard to the BWP switching timing and switching mode.

In step 1002, after the activated BWP is switched from the first BWP to the second BWP, a third PDCCH parameter of the second BWP is acquired.

In step 1003, a second PDCCH parameter of the power saving signal is re-determined according to the third PDCCH parameter.

The above step includes at least one of the following two sub-steps.

In the first sub-step, the parameters of the second PDCCH control resource set of the power saving signal are determined according to the parameter of the third PDCCH control resource set of the second BWP.

The terminal or the access network device determines a part or all of the parameters of the second PDCCH control resource set of the power saving signal according to the parameter of the third PDCCH control resource set of the second BWP. Details regarding this part may be easily thought of by those skilled in the art based on the embodiments shown in FIG. 5 or FIG. 6, and will not be repeated in the present embodiment.

In the second sub-step, the parameters of the second PDCCH search space of the power saving signal are determined according to the parameter of the third PDCCH search space of the second BWP.

The terminal or the access network device determines part or all of the parameters of the second PDCCH search space of the power saving signal according to the parameter of the third PDCCH search space of the second BWP. Details regarding this part may be easily thought of by those skilled in the art based on the embodiments shown in FIG. 7 or FIG. 9, and will not be repeated in the present embodiment.

The re-determined second PDCCH parameter takes effect immediately after the second BWP is successfully switched to. Alternatively, the re-determined second PDCCH parameter does not take effect until a preset time delay (delta T) after the second BWP is successfully switched to.

Figure 11:
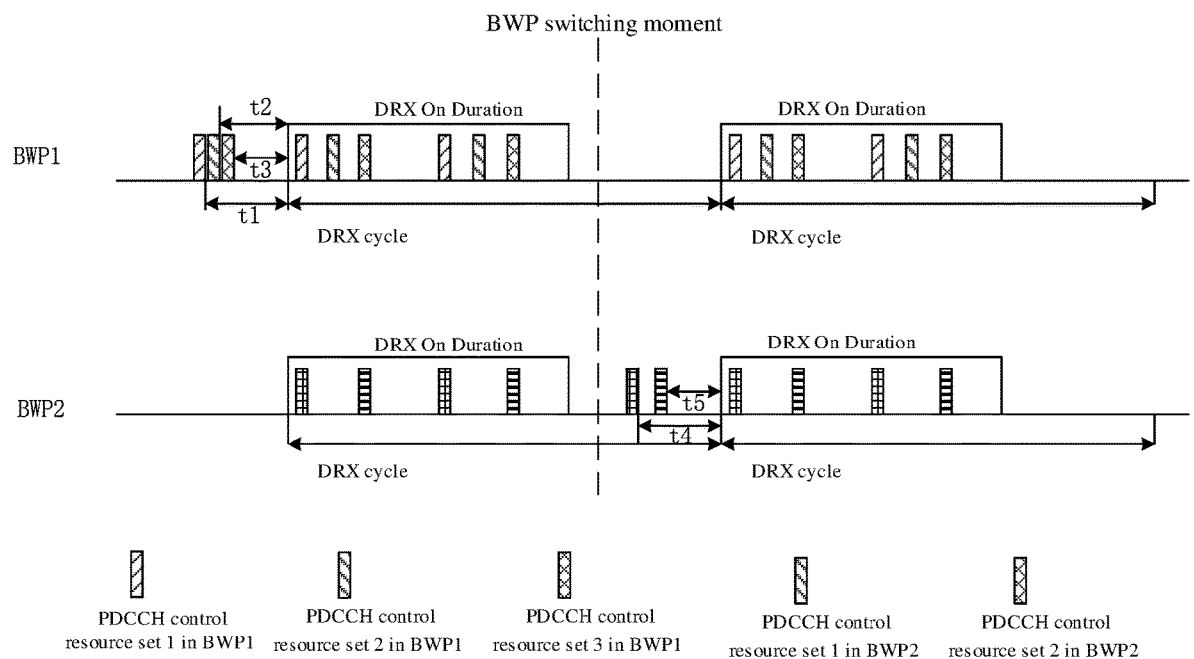
FIG. 11 is a flowchart of a method for determining a parameter of a power saving signal in a BWP switching scenario provided by an exemplary embodiment of the present disclosure.

With reference to FIG. 11, the activated BWP of the terminal is BWP1, and the PDCCH control resource set and/or PDCCH search space of the power saving signal are determined based on the three PDCCH control resource sets and/or PDCCH search space of BWP1. After the BWP switching, the activated BWP of the terminal is BWP2, and the PDCCH control resource set and/or PDCCH search space of the power saving signal are determined based on the two PDCCH control resource sets and/or PDCCH search space of BWP2.

It should be noted that in other embodiments, regardless of whether the BWP is switched, the PDCCH control resource set and/or PDCCH search space of the power saving signal is always determined based on the PDCCH control resource set and/or PDCCH search space of the designated BWP among the multiple BWPs of the terminal. For example, the designated BWP may be an initial BWP or a default BWP of the terminal.

Figure 12:
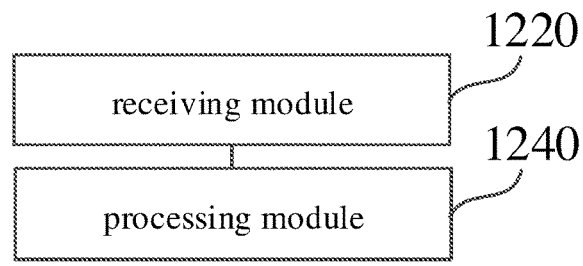
FIG. 12 is a schematic structural diagram of a device for determining a parameter of a power saving signal provided by an exemplary embodiment of the present disclosure.

FIG. 12 is a block diagram of a device for determining a parameter of a power saving signal provided by another exemplary embodiment of the present disclosure. The device may be implemented as all or a part of the terminal through software, hardware or a combination of both. The device includes a receiving module 1220 and a processing module 1240. The receiving module 1220 may be a hardware device such as a radio frequency antenna, and the processing module 1240 may be a hardware device such as a central processing unit or a baseband processor.

The receiving module 1220 is configured to acquire a first PDCCH parameter of a first BWP of the terminal.

The processing module 1240 is configured to determine a second PDCCH parameter of the power saving signal according to the first PDCCH parameter of the first BWP of the terminal.

In an optional embodiment, the first PDCCH parameter includes a parameter of a first PDCCH control resource set of PDCCH search space of the first BWP, and the processing module 1240 is configured to determine a part of parameters of a second PDCCH control resource set of the power saving signal according to the parameter of the first PDCCH control resource set of the PDCCH search space of the first BWP.

In an optional embodiment, the first PDCCH parameter includes a parameter of a first PDCCH control resource set of PDCCH search space of the first BWP, and the processing module 1240 is configured to determine all parameters of a second PDCCH control resource set of the power saving signal according to the parameter of the first PDCCH control resource set of the PDCCH search space of the first BWP.

In an optional embodiment, the parameter of the first PDCCH control resource set includes at least one of the following parameters: a PRB occupied by the first control resource set; a number of consecutive OFDM symbols occupied by the first control resource set; an initial value of a PDCCH DMRS scrambling sequence; a pre-coding granularity in frequency domain; a mapping type between a CCE and a REG; quasi co-location information of an antenna port; and an indication about whether a TCI field appears in a DCI format 1_1.

In an optional embodiment, the parameters of the second PDCCH control resource set include at least one of the following parameters: a PRB occupied by the second PDCCH control resource set; a number of consecutive OFDM symbols occupied by the second PDCCH control resource set; an initial value of the PDCCH DMRS scrambling sequence; a pre-coding granularity in frequency domain; a mapping type between a CCE and a REG; quasi co-location information of an antenna port; and an indication about whether a TCI field appears in a DCI format 1_1.

In an optional embodiment, the processing module 1240 is configured to determine a PDCCH control resource set among the PDCCH control resource sets of the first BWP as the first PDCCH control resource set according to a predetermined way. Alternatively, the receiving module 1220 is configured to receive a first configuration signaling, and the processing module 1240 is configured to determine a PDCCH control resource set among the PDCCH control resource sets of the first BWP as a parameter of the first PDCCH control resource set according to the first configuration signaling. Alternatively, the processing module 1240 is configured to determine a PDCCH control resource set occupying a narrowest bandwidth among the PDCCH control resource sets of the first BWP as the first PDCCH control resource set.

In an optional embodiment, the number of the second PDCCH control resource sets of the power saving signal is the same as the number of the first PDCCH control resource sets configured by the first BWP. Alternatively, the number of the second PDCCH control resource sets of the power saving signal is the same as the number of the first PDCCH control resource sets of the PDCCH search space of the first BWP. Alternatively, the number of the second PDCCH control resource sets of the power saving signal is the same as the number of the first PDCCH control resource sets with different TCI states of the PDCCH search space of the first BWP.

In an optional embodiment, the processing module 1240 is configured to determine a part of parameters of a second PDCCH search space of the power saving signal according to multiple parameters of the first PDCCH search space.

In an optional embodiment, the receiving module 1220 is configured to receive a second configuration signaling, and the processing module 1240 is configured to determine another part of parameters of the second PDCCH search space of the power saving signal according to the second configuration signaling.

In an optional embodiment, the processing module 1260 is configured to determine one or more target PDCCH search space in the first PDCCH search space of the BWP, and the processing module 1260 is configured to determine a part or all of parameters of the second PDCCH search space of the power saving signal according to the parameter of the target PDCCH search spaces.

In an optional embodiment, the processing module 1260 is configured to acquire a third PDCCH parameter of the second BWP after an activated BWP is switched from the first BWP to a second BWP, and re-determine the second PDCCH parameter of the power saving signal according to the third PDCCH parameter.

In an optional embodiment, the processing module 1260 is configured to determine a parameter of the second PDCCH control resource set of the power saving signal according to a parameter of a third PDCCH control resource set of the second BWP; and/or, the processing module 1260 is configured to determine a parameter of the second PDCCH search space of the power saving signal according to a parameter of the third PDCCH search space of the second BWP.

In an optional embodiment, the re-determined second PDCCH parameter takes effect immediately after the second BWP is successfully switched to. Alternatively, the re-determined second PDCCH parameter does not take effect until a preset time delay after the second BWP is successfully switched to.

In an optional embodiment, the first BWP is a designated BWP among multiple BWPs corresponding to the terminal.

Figure 13:
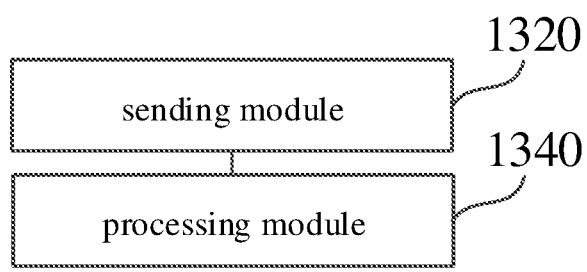
FIG. 13 is a structural schematic diagram of a device for determining a parameter of a power saving signal provided by an exemplary embodiment of the present disclosure.

FIG. 13 is a block diagram of a device for determining a parameter of a power saving signal provided by another exemplary embodiment of the present disclosure. The device may be implemented as all or a part of the access network device through software, hardware or a combination of both. The device includes a sending module 1320 and a processing module 1340. The sending module 1320 may be a hardware device such as a radio frequency antenna, and the processing module 1340 may be a hardware device such as a central processing unit or a baseband processor.

The processing module 1340 is configured to determine a second PDCCH parameter of the power saving signal according to a first PDCCH parameter of the first BWP of the terminal.

In an optional embodiment, the first PDCCH parameter includes a parameter of a first PDCCH control resource set of PDCCH search space of the first BWP, and the processing module 1340 is configured to determine a part of parameters of a second PDCCH control resource set of the power saving signal according to the parameter of the first PDCCH control resource set of the PDCCH search space of the first BWP.

In an optional embodiment, the first PDCCH parameter includes a parameter of a first PDCCH control resource set of PDCCH search space of the first BWP, and the processing module 1340 is configured to determine all parameters of a second PDCCH control resource set of the power saving signal according to the parameter of the first PDCCH control resource set of the PDCCH search space of the first BWP.

In an optional embodiment, the parameter of the first PDCCH control resource set includes at least one of the following parameters: a PRB occupied by the first control resource set; a number of consecutive OFDM symbols occupied by the first control resource set; an initial value of a PDCCH DMRS scrambling sequence; a pre-coding granularity in frequency domain; a mapping type between a CCE and a REG; quasi co-location information of an antenna port; and an indication about whether a TCI field appears in a DCI format 1_1.

In an optional embodiment, the parameters of the second PDCCH control resource set include at least one of the following parameters: a PRB occupied by the second PDCCH control resource set; a number of consecutive OFDM symbols occupied by the second PDCCH control resource set; an initial value of the PDCCH DMRS scrambling sequence; a pre-coding granularity in frequency domain; a mapping type between a CCE and a REG; quasi co-location information of an antenna port; an indication about whether a TCI field appears in a DCI format 1_1.

In an optional embodiment, the processing module 1340 is configured to determine a PDCCH control resource set among the PDCCH control resource sets of the first BWP as the first PDCCH control resource set according to a predetermined way. Alternatively, the sending module 1320 is configured to send a first configuration signaling, and the first configuration signaling is used for indicating that a PDCCH control resource set among the PDCCH control resource sets of the first BWP is determined as a parameter of the first PDCCH control resource set. Alternatively, the processing module 1340 is configured to determine a PDCCH control resource set occupying a narrowest bandwidth among the PDCCH control resource sets of the first BWP as the first PDCCH control resource set.

In an optional embodiment, the number of the second PDCCH control resource sets of the power saving signal is the same as the number of the first PDCCH control resource sets configured by the first BWP. Alternatively, the number of the second PDCCH control resource sets of the power saving signal is the same as the number of the first PDCCH control resource sets of the PDCCH search space of the first BWP. Alternatively, the number of the second PDCCH control resource sets of the power saving signal is the same as the number of the first PDCCH control resource sets with different TCI states of the PDCCH search space of the first BWP.

In an optional embodiment, the processing module 1340 is configured to determine a part of parameters of a second PDCCH search space of the power saving signal according to multiple parameters of the first PDCCH search space.

In an optional embodiment, the sending module 1320 is configured to send a second configuration signaling, and the second configuration signaling is used for indicating another part of the parameters of the second PDCCH search space of the power saving signal.

In an optional embodiment, the processing module 1360 is configured to determine one or more target PDCCH search space in the first PDCCH search space of the BWP, and the processing module 1360 is configured to determine a part or all of parameters of the second PDCCH search space of the power saving signal according to a parameter of the target PDCCH search space.

In an optional embodiment, the processing module 1360 is configured to acquire a third PDCCH parameter of the second BWP after an activated BWP is switched from the first BWP to a second BWP, and re-determine the second PDCCH parameter of the power saving signal according to the third PDCCH parameter.

In an optional embodiment, the processing module 1360 is configured to determine a parameter of the second PDCCH control resource set of the power saving signal according to a parameter of a third PDCCH control resource set of the second BWP; and/or, the processing module 1360 is configured to determine a parameter of the second PDCCH search space of the power saving signal according to a parameter of the third PDCCH search space of the second BWP.

In an optional embodiment, the re-determined second PDCCH parameter takes effect immediately after the second BWP is successfully switched to. Alternatively, the re-determined second PDCCH parameter does not take effect until a preset time delay after the second BWP is successfully switched to.

In an optional embodiment, the first BWP is a designated BWP among multiple BWPs corresponding to the terminal.

Figure 14:
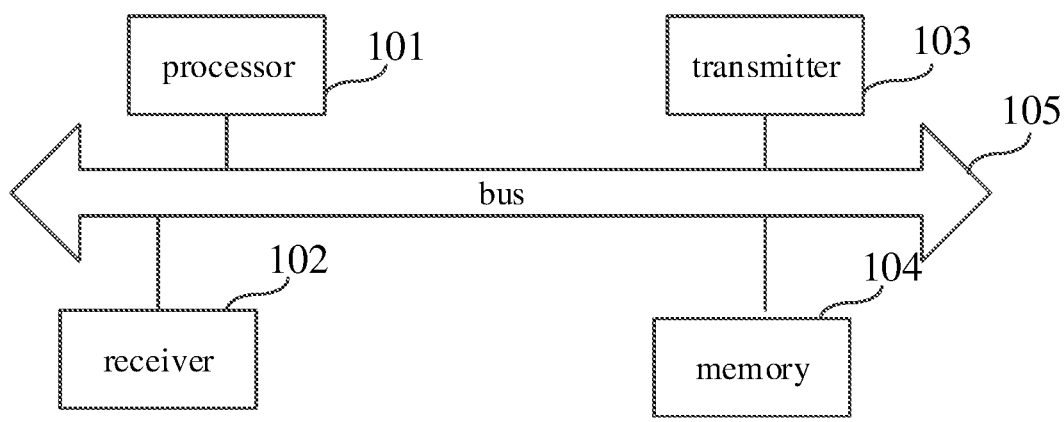
FIG. 14 is a block diagram of a terminal provided by another exemplary embodiment of the present disclosure.

FIG. 14 shows a schematic structural diagram of a terminal provided by an exemplary embodiment of the present disclosure. The terminal includes a processor 101, a receiver 102, a transmitter 103, a memory 104, and a bus 105.

The processor 101 includes one or more processing core, and the processor 101 executes various functional applications and information processing by running software programs and modules.

The receiver 102 and the transmitter 103 may be implemented as a communication component. The communication component may be a communication chip.

The memory 104 is connected to the processor 101 via a bus 105.

The memory 104 may be used to store at least one instruction, and the processor 101 is configured to execute the at least one instruction to implement each step in the foregoing method embodiments.

In addition, the memory 104 may be implemented by any type of volatile or non-volatile memory device, or a combination thereof. The volatile or non-volatile memory device includes, but is not limited to: a magnetic disk or an optical disk, an electrically erasable programmable read only memory (EEPROM), an erasable programmable read only memory (EPROM), a static random access memory (SRAM), a read only memory (ROM), a magnetic memory, a flash memory, a programmable read only memory (PROM).

In an exemplary embodiment, there is also provided a computer-readable storage medium. The computer-readable storage medium stores at least one instruction, at least one program, a code set, or an instruction set, wherein the at least one instruction, the at least one program, the code set, or the instruction set is loaded and executed by the processor to implement the method for determining the parameter of the power saving signal executed by the terminal provided in the foregoing method embodiments.

Figure 15:
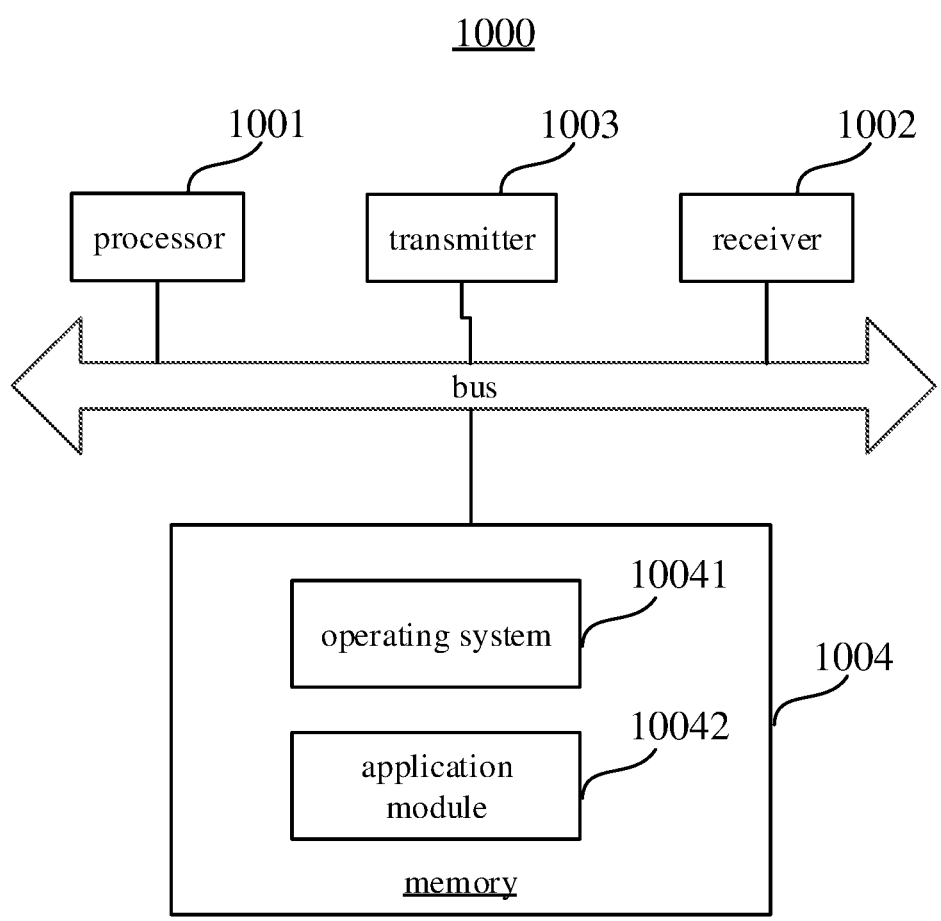
FIG. 15 is a block diagram of an access network device provided by another exemplary embodiment of the present disclosure.

FIG. 15 is a block diagram showing an access network device 1000 according to an exemplary embodiment.

The access network device 1000 may include a processor 1001, a receiver 1002, a transmitter 1003, and a memory 1004. The receiver 1002, the transmitter 1003, and the memory 1004 are connected to the processor 1001 through a bus, respectively.

The processor 1001 includes one or more processing core, and the processor 1001 runs software programs and modules to execute each step executed by the access network device in the foregoing method embodiments. The memory 1004 may be configured to store software programs and modules. Specifically, the memory 1004 may store an operating system 10041 and an application module 10042 required by at least one function. The receiver 1002 is configured to receive communication data sent by other devices, and the transmitter 1003 is configured to send communication data to other devices.

In an exemplary embodiment, there is also provided a computer-readable storage medium. The computer-readable storage medium stores at least one instruction, at least one program, a code set, or an instruction set, wherein the at least one instruction, the at least one program, the code set, or the instruction set is loaded and executed by the processor to implement the method for determining the parameter of the power saving signal provided in the foregoing method embodiments.

The "multiple" in embodiments of the present disclosure refers to two or more.

Those of ordinary skill in the art should understand that all or part of the steps of the abovementioned embodiments may be completed through hardware, or may also be completed through the relevant hardware instructed by a program, wherein the program may be stored in a computer-readable storage medium, and the storage medium may be a read-only memory, a magnetic disk, an optical disk or the like.

The above are only some embodiments of the present disclosure, and are not intended to limit the present disclosure. Any modification, equivalent substitution, improvement, etc., within the spirit and principle of the present disclosure, should be included in the protection scope of the present disclosure.

What is claimed is:

1. A method for determining a parameter of a power saving signal, comprising:
    acquiring a first physical downlink control channel (PDCCH) parameter of a first bandwidth part (BWP) of a terminal; and
    determining a second physical downlink control channel (PDCCH) parameter of the power saving signal according to the first PDCCH parameter of the first bandwidth part (BWP) of the terminal, wherein
    a number of second PDCCH control resource sets of the power saving signal is the same as a number of first PDCCH control resource sets configured by the first BWP;
    a number of the second PDCCH control resource sets of the power saving signal is the same as a number of the first PDCCH control resource sets of a PDCCH search space of the first BWP; or
    a number of the second PDCCH control resource sets of the power saving signal is the same as a number of the first PDCCH control resource sets, having different quasi co-location information TCI states, of the PDCCH search space of the first BWP.

2. The method according to claim 1, wherein:
    the first PDCCH parameter comprises a parameter of the first PDCCH control resource set of the PDCCH search space of the first BWP; and
    the determining the second PDCCH parameter of the power saving signal according to the first PDCCH parameter of the first BWP of the terminal, comprises:
        determining a part of parameters of the second PDCCH control resource set of the power saving signal according to the parameter of the first PDCCH control resource set of the PDCCH search space of the first BWP.

3. The method according to claim 1, wherein:
    the first PDCCH parameter comprises a parameter of the first PDCCH control resource set of the PDCCH search space of the first BWP; and
    the determining the second PDCCH parameter of the power saving signal according to the first PDCCH parameter of the first BWP of the terminal, comprises:
        determining all parameters of the second PDCCH control resource set of the power saving signal according to the parameter of the first PDCCH control resource set of the PDCCH search space of the first BWP.

4. The method according to claim 1, wherein:
    the first PDCCH parameter comprises a parameter of a first PDCCH search space of the first BWP; and
    the determining the second PDCCH parameter of the power saving signal according to the first PDCCH parameter of the first BWP of the terminal, comprises:
        determining a part of parameters of a second PDCCH search space of the power saving signal according to the parameter of the first PDCCH search space.

5. The method according to claim 4, wherein the method is applied to the terminal and further comprises:
    receiving a second configuration signaling; and
    determining another part of the parameters of the second PDCCH search space of the power saving signal according to the second configuration signaling.

6. The method according to claim 4, wherein the method is applied to an access network device and further comprises:
    sending a second configuration signaling, wherein the second configuration signaling is configured to indicate another part of the parameters of the second PDCCH search space of the power saving signal.

7. The method according to claim 1, wherein:
    the first PDCCH parameter comprises a parameter of a first PDCCH search space of the first BWP; and the determining the second PDCCH parameter of the power saving signal according to the first PDCCH parameter of the first BWP of the terminal, comprises:
  determining one or more target PDCCH search spaces in the first PDCCH search space of the BWP; and
  determining a part or all of parameters of a second PDCCH search space of the power saving signal according to a parameter of the target PDCCH search space.

8. The method according to claim 1, further comprising:
  acquiring, after an activated BWP is switched from the first BWP to a second BWP, a third PDCCH parameter of the second BWP; and
  re-determining the second PDCCH parameter of the power saving signal according to the third PDCCH parameter.

9. The method according to claim 1, wherein the first BWP is a designated BWP among a plurality of BWPs corresponding to the terminal.

10. A device, comprising:
  a processor;
  a transceiver, connected to the processor; and
  a memory, configured to store an executable instruction of the processor,
  wherein the processor is configured to load and execute the executable instruction to perform operations of:
    acquiring a first physical downlink control channel (PDCCH) parameter of a first bandwidth part (BWP) of a terminal; and
    determining a second physical downlink control channel (PDCCH) parameter of the power saving signal according to the first PDCCH parameter of the first bandwidth part (BWP) of the terminal, wherein
    a number of second PDCCH control resource sets of the power saving signal is the same as a number of first PDCCH control resource sets configured by the first BWP;
    a number of the second PDCCH control resource sets of the power saving signal is the same as a number of the first PDCCH control resource sets of a PDCCH search space of the first BWP; or
    a number of the second PDCCH control resource sets of the power saving signal is the same as a number of the first PDCCH control resource sets, having different quasi co-location information TCI states, of the PDCCH search space of the first BWP.

11. The device according to claim 10, wherein:
  the first PDCCH parameter comprises a parameter of the first PDCCH control resource set of the PDCCH search space of the first BWP; and
  the determining the second PDCCH parameter of the power saving signal according to the first PDCCH parameter of the first BWP of the terminal, comprises:
    determining a part of parameters of the second PDCCH control resource set of the power saving signal according to the parameter of the first PDCCH control resource set of the PDCCH search space of the first BWP.

12. The device according to claim 10, wherein:
  the first PDCCH parameter comprises a parameter of the first PDCCH control resource set of the PDCCH search space of the first BWP; and
  the determining the second PDCCH parameter of the power saving signal according to the first PDCCH parameter of the first BWP of the terminal, comprises:
    determining all parameters of the second PDCCH control resource set of the power saving signal according to the parameter of the first PDCCH control resource set of the PDCCH search space of the first BWP.

13. The device according to claim 10, wherein:
  the first PDCCH parameter comprises a parameter of a first PDCCH search space of the first BWP; and
  the determining the second PDCCH parameter of the power saving signal according to the first PDCCH parameter of the first BWP of the terminal, comprises:
    determining a part of parameters of a second PDCCH search space of the power saving signal according to the parameter of the first PDCCH search space.

14. The device according to claim 13, wherein the device is applied to the terminal, and the processor is further configured to load and execute the executable instruction to perform operations of:
  receiving a second configuration signaling; and
  determining another part of the parameters of the second PDCCH search space of the power saving signal according to the second configuration signaling.

15. The device according to claim 13, wherein the device is applied to an access network device, and the processor is further configured to load and execute the executable instruction to perform operations of:
  sending a second configuration signaling, wherein the second configuration signaling is configured to indicate another part of the parameters of the second PDCCH search space of the power saving signal.

16. The device according to claim 10, wherein:
  the first PDCCH parameter comprises a parameter of a first PDCCH search space of the first BWP; and
  the determining the second PDCCH parameter of the power saving signal according to the first PDCCH parameter of the first BWP of the terminal, comprises:
    determining one or more target PDCCH search space in the first PDCCH search space of the BWP; and
    determining a part or all of parameters of a second PDCCH search space of the power saving signal according to a parameter of the target PDCCH search space.

17. The device according to claim 10, wherein the processor is further configured to load and execute the executable instruction to perform operations of:
  acquiring, after an activated BWP is switched from the first BWP to a second BWP, a third PDCCH parameter of the second BWP; and
  re-determining the second PDCCH parameter of the power saving signal according to the third PDCCH parameter.

18. The device according to claim 10, wherein the first BWP is a designated BWP among a plurality of BWPs corresponding to the terminal.

* * * * *